Jan. 17, 1961 F. P. KALLENBORN 2,968,785
MULTIPLE CONNECTOR
Filed Jan. 18, 1960

INVENTOR.
Frank P. Kallenborn.

United States Patent Office 2,968,785
Patented Jan. 17, 1961

2,968,785
MULTIPLE CONNECTOR

Frank P. Kallenborn, 9240 S. 73rd Ave., Oak Lawn, Ill.

Filed Jan. 18, 1960, Ser. No. 2,914

2 Claims. (Cl. 339—208)

This invention relates to electrical terminal connectors, and more specifically to a four point junction box for drop cord extension lines of a power supply involving three wires.

In both temporary and permanent wiring installation, there is a need for a junction box wherein the different branches may be disconnected without upsetting or interrupting the remaining circuits. It would be preferable also that such junctions may be connected and disconnected without the use of tools, and without having to interfere physically with live wires. Such connections should also be mechanically and electrically sound so as to withstand considerable stress without danger of shorting or discontinuity.

It is therefore a primary object of this invention to construct a junction box and terminals to which the terminals of extention cables may be attached with safety and in a rigid manner without need to interrupt the power supply.

It is a further object of the invention to provide a junction box of the above nature which is provided with mechanically interlocking terminal connections operable without the use of tools, which is sturdy and reliable, and capable of withstanding considerable stress without danger of arcing or discontinuity.

It is a still further object of the invention to provide a junction box of the above nature which may be equally adapted for single or triple phase circuits.

It is yet a further object of the invention to provide a junction box of the above nature in which the danger of crossing phases, or in the case of direct current, the danger of mixing polarities has been eliminated.

The invention consists of a junction box formed in the shape of a cross. Each arm of the cross contains three terminals symmetrically disposed along the top face thereof. Each terminal face is electrically connected to the corresponding terminal of each arm. Extension line terminal boxes formed in the shape of an L have mating terminals disposed on the underside thereof which intimately locate with the terminals of an arm of the junction box. A cable is secured to the outside of the terminal box, and means are provided for connecting the wires of the cables to the appropriate terminals. The terminal boxes locate over the ends of the junction box arms, and combine with the said ends to form a block of substantially square cross section. The corners of the block so formed are threaded to receive a sleeve, operable to hold the terminal and junction box arm firmly together.

Other objects and advantages of the invention together with a full understanding of the construction thereof will be had from the following detailed description of a preferred embodiment taken in conjunction with the attached drawings wherein.

Like reference characters indicate corresponding parts throughout the several views in the drawing.

Figure 1:
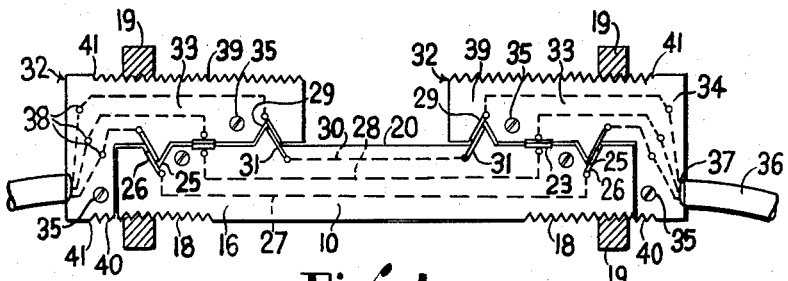
Fig. 1 is a side elevation showing two opposing arms of the junction box operatively connected to two extension line terminal boxes, the remaining two arms of the junction box have not been incorporated for the sake of clarity.
Figure 2:
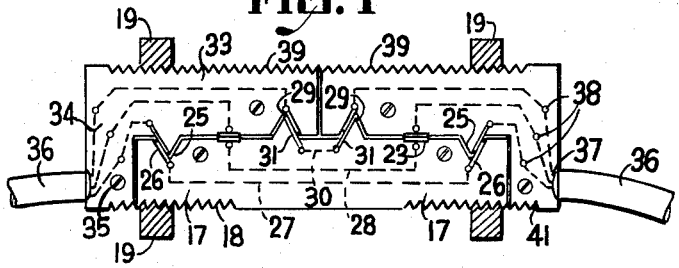
Fig. 2 is a side elevation of the other two opposing arms of the junction box connected to two extension line terminal boxes.
Figure 3:
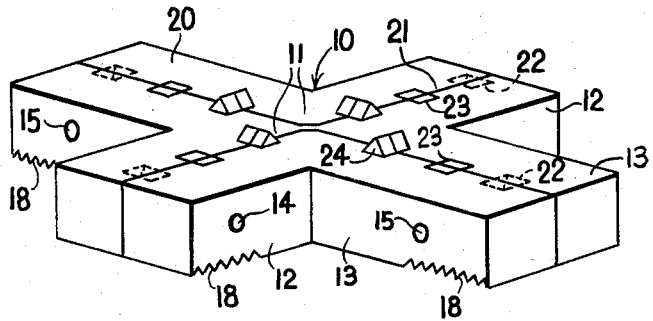
Fig. 3 is a perspective view of the junction box shown without terminals attached.

Referring now to the drawing, the numeral 10 is the junction box which is constructed in the shape of a cross by the assembly of four identical L shaped elements 11. Each element 11 has a base 12 and a longer member 13 projecting at right angles from one end. Holes 14 and 15 are drilled through bases 12 and members 13 respectively, to receive bolts for joining the elements to form a cross having two opposing longer arms 16 and two opposing shorter arms 17 each having a rectangular cross section. Threads 18 are cut into outer edge of arms 16 and 17 to provide a portion of an interrupted circular thread adapted to receive a threaded sleeve such as 19.

The top face 20 of the junction box is bisected centrally of each arm by the joints 21 made in the assembly of elements 11. Three terminals 22, 23 and 24 are equispaced on the top face along the joints 21 of each arm. The terminal 22 which may be considered for the sake of reference as the positive terminal, consists of a wedge shaped groove having an apex 25 disposed normally to the plane of the joint 21 and below the top face 20 of the box.

An electrical contact surface 26 is disposed on one side of the groove and is connected by a wire 27 to similar terminals 22 on the remaining arms of the box. The terminal 23 is considered as the earth or neutral terminal, and consists of a conductive pad, the surface of which lies slightly outward of the top face. These terminals are interconnected by a conductive wire 28. The terminal 24 is considered as the negative terminal, and consists of a wedge shaped projection having an apex 29 disposed normally to the joint 21 and above the top face 20. These terminals are interconnected to all arms by a conductive wire 30 secured to contact surfaces 31 disposed on one face of the projection.

An extension line terminal box 32 consists of a horizontally disposed arm 33 and a vertical member 34 projecting downwardly from one end. The box is constructed from two L shaped members which are secured together by screws 35, the joint so formed bisects the box in a vertical plane. A three wire cable 36 is received in an opening 37 disposed centrally of the joint on the outer side of member 34. The wires are connected to permanently installed conductors at points 38. The underside of the arm 33 is provided with terminal contact faces which are positioned to engage with the contact faces 23, 26 and 31 located on each arm of the junction box 20. The outer edges of arm 33 are threaded at 39 and similar threads 40 are cut in the lower edges of member 34 of the terminal box. The above threads terminate short of the outer end of the terminal box at 41, to provide a stop for a threaded sleeve or ring 19. The terminal box drops into position on the junction box arm to form a combined junction of square cross section. The junction is retained by the sleeve 19 which is screwed from the stop location 41 to engage with threads 18 on the lower edges of the junction box arms.

In another method of construction, the junction box and extension terminal boxes may be formed as single molded units. The terminals and interconnecting conductors would be installed in the die prior to injection molding each unit. The method of construction will depend on the volume of units which are produced.

From the foregoing, it is believed that the construction and operation of the invention will be readily understood. However, since numerous modifications will occur to those skilled in the art, it is not desired to limit the construction exactly to that shown and described, and accordingly, modifications and equivalents may be resorted to, falling within the scope of the appended claims.

I claim:

1. A multiple electrical extension connector, comprising a junction box having four laterally extending arms projecting symmetrically from a central point, three spaced terminals disposed centrally along the top face of one of the arms, said terminals being electrically connected to corresponding terminals similarly disposed on each of the remaining arms, an extension terminal box having different terminals located on one face adapted for engagement with the terminals disposed on one of the arms, said engagement being possible in only one terminal relationship, and a threaded sleeve adapted to mesh with threads formed on the lower side of said arm and the upper side of said terminal box to retain said arm and said terminal box in an engaged relationship.

2. A multiple electrical extension connector, comprising a junction box having four laterally extending arms projecting symmetrically from a central point, three spaced terminals disposed centrally along the top face of one of the arms, said terminals being electrically connected to corresponding terminals similarly disposed on each of the remaining arms, an extension terminal box provided for each arm consisting of an L shaped member adapted to locate with the top and end surface of any of said arms, different terminals disposed on the underside of the terminal box adapted to locate with the top surface of an arm, said different terminals adapted to engage with said arm terminals in only one terminal relationship, wires connecting said different terminals with an extension cable, said extension terminal box locating with an arm to form a cross section having extremities which are threaded to receive a sleeve for retaining said terminal box in rigid electrically and mechanically locked contact with said arm.

References Cited in the file of this patent

UNITED STATES PATENTS

| | | |
|---|---|---|
| 1,290,153 | Fitzpatrick | Jan. 7, 1919 |
| 2,825,039 | Schurman et al. | Feb. 25, 1958 |